United States Patent
Yang et al.

(10) Patent No.: US 8,531,588 B2
(45) Date of Patent: Sep. 10, 2013

(54) METHOD FOR ADJUSTING EXPOSURE CONDITION OF OPTICAL SENSOR MODULE AND OPTICAL SENSOR MODULE THEREOF

(75) Inventors: Shu-Sian Yang, Hsinchu County (TW); Hsin-Chia Chen, Hsinchu County (TW); Tzung-Min Su, Hsinchu County (TW)

(73) Assignee: Pixart Imaging Inc., Hsinchu County (TW)

(*) Notice: Subject to any disclaimer, the term of this patent is extended or adjusted under 35 U.S.C. 154(b) by 248 days.

(21) Appl. No.: 13/080,563

(22) Filed: Apr. 5, 2011

(65) Prior Publication Data

US 2011/0181511 A1 Jul. 28, 2011

Related U.S. Application Data

(63) Continuation-in-part of application No. 12/820,920, filed on Jun. 22, 2010, now Pat. No. 8,390,736.

(60) Provisional application No. 61/220,559, filed on Jun. 25, 2009.

(30) Foreign Application Priority Data

May 14, 2010 (TW) ............................... 99115589 A
Dec. 1, 2010 (TW) ............................... 99141710 A

(51) Int. Cl.
*H04N 5/238* (2006.01)
*G06F 3/033* (2013.01)
*G09G 5/08* (2006.01)

(52) U.S. Cl.
USPC ............................................ 348/364; 345/166

(58) Field of Classification Search
None
See application file for complete search history.

(56) References Cited

U.S. PATENT DOCUMENTS

| 6,906,753 | B1 * | 6/2005 | Matoba et al. | 348/362 |
| 7,230,606 | B2 * | 6/2007 | Ahn | 345/166 |
| 2005/0110776 | A1 * | 5/2005 | Tan et al. | 345/179 |

* cited by examiner

*Primary Examiner* — Albert Cutler
(74) *Attorney, Agent, or Firm* — Morris, Manning & Martin LLP; Tim Tingkang Xia, Esq.

(57) ABSTRACT

A method for adjusting an exposure condition of an optical sensor module includes the following steps, (A) receiving reflected light reflected by a working surface; (B) generating an image signal by exposing the optical sensor module to the reflected light, in which the image signal includes a plurality of luminance signals and an image quality signal; (C) setting an exposure condition of the optical sensor module according to part of the luminance signals; (D) repeating Step (B) and Step (C) under different exposure conditions so that the optical sensor module generates a plurality of image quality signals; and (E) setting an optimal exposure condition corresponding to the working surface according to the image quality signals under the different exposure conditions. The optical sensor module is applicable to a pointing device.

12 Claims, 3 Drawing Sheets

METHOD FOR ADJUSTING EXPOSURE CONDITION OF OPTICAL SENSOR MODULE AND OPTICAL SENSOR MODULE THEREOF

CROSS-REFERENCE TO RELATED APPLICATIONS

This non-provisional application claims priority under 35 U.S.C. §119(a) on Patent Application No. 099141710 filed in Taiwan, R.O.C. on Dec. 1, 2010 and Patent Application No. 099115589 filed in Taiwan, R.O.C. on May 14, 2010, the entire contents of which are hereby incorporated by reference. This application is also a continuation-in-part patent application of U.S. application Ser. No. 12/820,920 filed on Jun. 22, 2010, which itself claims priority under 35 U.S.C. §119(e) on U.S. Provisional Patent Application No. 61/220,559 filed in the United States on Jun. 25, 2009, the entire contents of which are hereby incorporated by reference.

BACKGROUND OF THE INVENTION

1. Field of the Invention

The present invention relates to a method for adjusting an exposure condition and an optical sensor module thereof, and more particularly to a method for adjusting an exposure condition of an optical sensor module and an optical sensor module applying the method.

2. Related Art

Currently, an image capture device has been widely used in the daily life. After the image capture device uses an optical sensor to capture an image and converts the image to digital signals, the digital signals are stored. Various kinds of applications can be designed by combining the digital signals captured by the image capture device with a digital image processing technology.

The image capture device is also applicable to a general pointing device, for example, a mouse. The pointing device emits light to a surface, and the light reflected from the surface is captured by the image capture device. After appropriate sampling, the pointing device obtains images at a plurality of time points. A digital processor in the pointing device compares the images at the adjacent time points, and judges a direction and distance of movement of the pointing device according to luminance differences of pixels in the images.

However, when the pointing device works on different surfaces, the different surfaces have varying strengths in reflecting light due to the surface materials. Thus, the intensity of the reflected light received by the pointing device also differs from each other. If the reflected light is captured under the same optical condition, a phenomenon of uneven brightness occurs so that the pointing device makes an error in judging the direction and distance of the movement.

SUMMARY OF THE INVENTION

Accordingly, the present invention is a method for adjusting an exposure condition of an optical sensor module, in which the optical sensor module is applicable to a pointing device. The method comprises the following steps: (A) receiving reflected light reflected by a working surface; (B) generating an image signal by exposing the optical sensor module to the reflected light, in which the image signal comprises a plurality of luminance signals and an image quality signal; (C) setting an exposure condition of the optical sensor module according to part of the luminance signals; (D) repeating Step (B) and Step (C) under different exposure conditions so that the optical sensor module generates a plurality of image quality signals; and (E) setting an optimal exposure condition corresponding to the working surface according to the image quality signals under the different exposure conditions.

The method further comprises the following steps: (F) performing a motion estimation procedure according to the plurality of image signals to generate a reliability signal; and (G) re-performing Step (A) to Step (E) when the reliability signal is lower than a threshold value.

The present invention is further an optical sensor module, which is applicable to a pointing device. The pointing device moves relatively to a working surface and uses the optical sensor module to detect the relative movement to generate a displacement signal. The optical sensor module comprises a plurality of optical sensor units and a processor.

The plurality of optical sensor units are used for periodically receiving reflected light reflected by a working surface and generating in a sequence a plurality of image signals. Each of the image signals comprises a plurality of luminance signals and an image quality signal.

The processor is used for setting in a sequence an exposure condition of the optical sensor module according to part of the luminance signals of each of the image signals, and setting an optimal exposure condition corresponding to the working surface according to the image quality signals under different exposure conditions.

The exposure condition is one of the exposure time and the exposure intensity of the optical sensor module, or the light intensity of the reflected light.

Through the above method and device, an optical sensor module is capable of automatically adjusting an exposure condition thereof so that the optical sensor module adapts to different working surfaces, thereby reducing probability of errors in judging a direction and distance of movement due to uneven brightness of light reflected by the working surfaces.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The detailed features and advantages of the present invention are described below in great detail through the following embodiments, the content of the detailed description is sufficient for those skilled in the art to understand the technical content of the present invention and to implement the present invention there accordingly. Based upon the content of the specification, the claims, and the drawings, those skilled in the art can easily understand the relevant objectives and advantages of the present invention.

Figure 1:
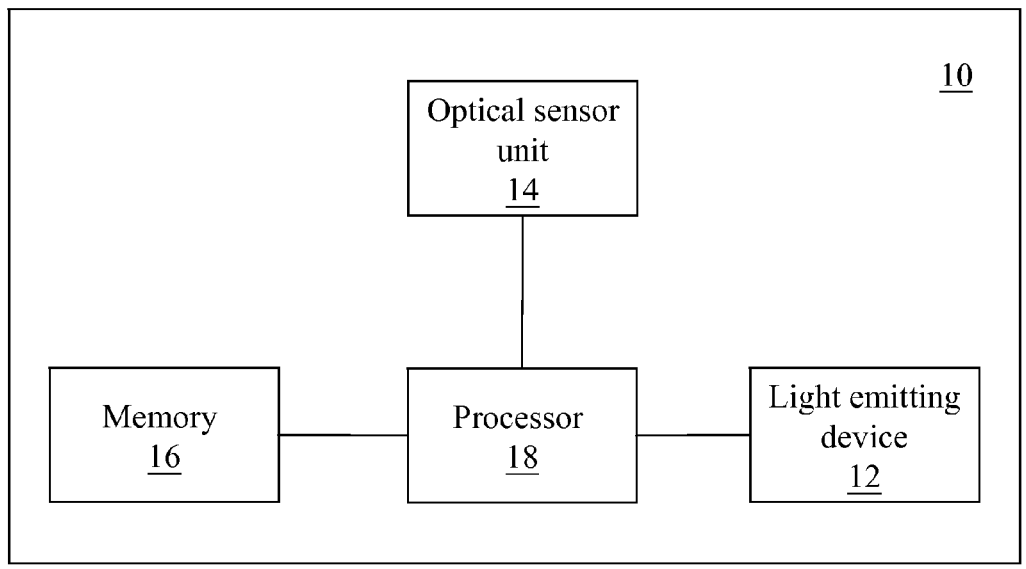
FIG. 1 is a schematic architectural view of an image capture device according to the present invention.

FIG. 1 is a schematic architectural view of an image capture device according to the present invention. The image capture device according to the present invention may be, but is not limited to, the architecture as shown in FIG. 1.

Referring to FIG. 1, an optical sensor module 10 comprises a light emitting device 12, a plurality of optical sensor units 14, a memory 16, and a processor 18.

The light emitting device 12 emits light to a working surface, in which the light emitting device 12 may be a light emitting diode or a laser light emitting device. After the light is emitted to the working surface and is reflected, the reflected light may be received by the plurality of optical sensor units 14.

The plurality of optical sensor units 14 receives in a fixed or non-fixed period the reflected light. The plurality of optical sensor units 14 may be charge coupled devices (CCD) or Complementary Metal-Oxide-Semiconductors (CMOS), in which each of the optical sensor units 14 represents a pixel. After the reflected light is received and passes through an Analogue-to-Digital Conversion (ADC), the plurality of optical sensor units 14 generates a plurality of image signals in a time sequence. Each of the image signals comprises a plurality of luminance signals and an image quality signal. The luminance signals may be image signals of multi-bit gray scale or binary image signals. The plurality of optical sensor units 14 can change the luminance values of the image signals by adjusting a length of the exposure time or exposure intensity.

The memory 16 is used for storing the plurality of image signals. The processor 18 may be a microprocessor, a micro controller, an Application-specific Integrated Circuit (ASIC) or a Field Programmable Gate Array (FPGA), and the processor 18 can be used not only for controlling the light emitting device 12, the optical sensor units 14, and the memory 16, but also for performing the method for adjusting photographic parameters provided by the present invention.

In the present invention, the processor 18 is used for setting an exposure condition of the optical sensor module 10 in a sequence according to part of the luminance signals in each of the image signals. The optical sensor module 10 generates the plurality of image signals according to a plurality of different exposure conditions, and selects the exposure condition of one image as the optimal exposure condition from the image signals according to the image quality signals.

Characteristics of the device according to the present invention are described as above, and a detailed description of the steps according to the present invention is given hereinafter.

Figure 2:
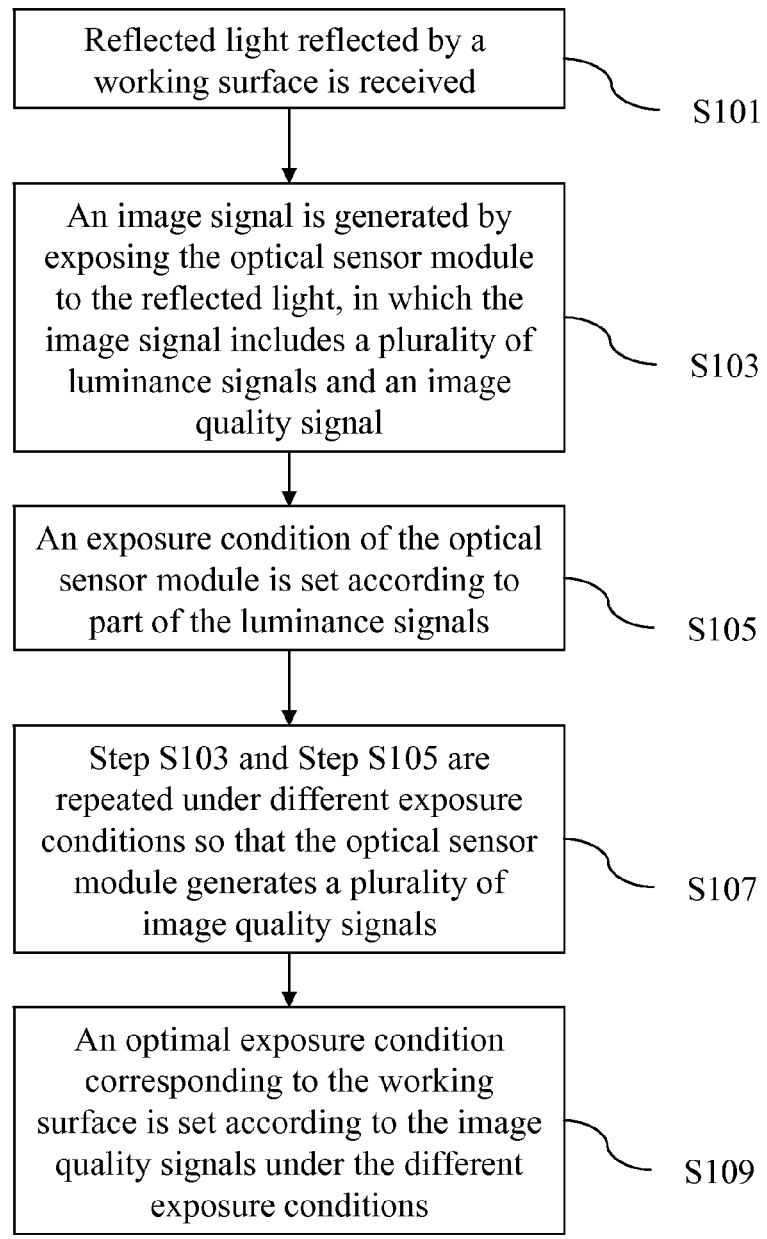
FIG. 2 is a flow chart of a first embodiment of a method for adjusting an exposure condition of an optical sensor module according to the present invention.

FIG. 2 is a flow chart of a first embodiment of a method for adjusting an exposure condition of an optical sensor module according to the present invention.

Referring to FIG. 2, in Step S101, light is emitted by the light emitting device 12 to a working surface, and the reflected light is received by the plurality of optical sensor units 14 in the optical sensor module 10.

In Step S103, after the reflected light is received, the optical sensor module 10 generates image signals by processing the reflected light. Each of the image signals comprises a plurality of luminance signals and an image quality signal. The image signal consists of a plurality of pixels, in which each of the pixels corresponds to a luminance signal. The image quality signal represents a contrast value of the image signal, in which the contrast value is defined as a ratio of a maximum value in the luminance signals (or a group with a maximum average after the pixels are divided into groups) to a minimum value (or a group with a minimum average after the pixels are divided into groups).

In Step S105, the optical sensor units 14 are divided into a plurality of blocks; in other words, the plurality of image signals are divided into a plurality of groups. Each of the blocks is better to be a grid. The processor 18 respectively calculates a luminance average of each of the blocks according to the plurality of divided blocks. The luminance average of each of the blocks is defined as an arithmetic average or a weighted average of all of the pixels in the block.

In this embodiment, the above blocks can be sequenced according to the luminance values thereof. The processor 18 selects at least one from the blocks, and averages out the luminance signals of all pixels in the selected block to obtain an average of the luminance signals.

Then, according to a set target luminance value, the processor 18 generates a difference signal by comparing the target luminance value with the average of the luminance signals. The difference signal may be a value obtained by subtracting the average of the luminance signals from the target luminance value. The exposure condition of the optical sensor module 10 can be adjusted by using the difference signal. The adjusting the exposure condition herein may be adjusting either the exposure time or the exposure intensity of the optical sensor units 14, or adjusting both the exposure time and the exposure intensity thereof, or changing the light emitted by the light emitting device 12 to adjust the light intensity of the reflected light.

For example, supposing that the image signals are divided into twenty-five blocks, in which each of the blocks is sequenced according to the luminance averages thereof and respectively is called in a descending order as B1, B2, B3 . . . B25. In the method, a plurality of continuous blocks in the sequence is selected, for example, blocks B1 to B5 are selected. Then, an average of the luminance signals of all pixels in the blocks B1 to B5 is calculated, and the exposure condition is adjusted according to the average. Next time when the step is performed, the blocks B2 to B6 are selected, and an average of the luminance signals of all pixels in the blocks B2 to B6 is calculated, and the exposure condition is adjusted according to the average. The step is repeated until the blocks B21 to B25 are selected.

If the average of the luminance signals of all pixels in the blocks B1 to B5 is "100" and the set target luminance value is "150", then the difference signal is "+50", which represents that the luminance of the selected blocks is a little bit low. The processor 18 may extend the exposure time of the optical sensor units 14, enhance the exposure intensity of the optical sensor units 14, or increase the light-emitting intensity of the light emitting device 12.

If the average of the luminance signals of all pixels in the blocks B21 to B25 is "200" and the set target luminance value is "150", then the difference signal is "−50", which represents that the luminance of the selected blocks is a little bit high. The processor 18 may shorten the exposure time of the optical sensor units 14, reduce the exposure intensity of the optical sensor units 14, or decrease the light-emitting intensity of the light emitting device 12.

When the photographic parameters are adjusted, the adjustment can be set to be performed immediately in a period of every two adjacent images, or in a multi-stage manner. If the adjustment is performed in a multi-stage manner, a plurality of gradually increasing or decreasing target values can be set. For example, if the average is "50" and the final target value is "180", during the first adjustment, the luminance value is adjusted firstly to "100", then to "140", and finally to the target value "180"; in other words, the luminance of the image is adjusted to the target value after a period of capturing three images.

After the adjusting the exposure condition is completed, the optical sensor module 10 can capture a new image signal under a new exposure condition. Furthermore, the optical sensor module 10 may analyze the image signal to obtain the image quality signal corresponding to the image signal.

Then, in Step S107, Steps S103 and S105 are repeated so as to obtain a plurality of image signals and a plurality of image quality signals corresponding to the plurality of image signals.

Following the example in the above description, the optical sensor module 10 can adjust different exposure conditions according to the different blocks (for example, the blocks B1 to B5, the blocks B2 to B6, the blocks B3 to B7 ... the blocks B21 to B25). Under the different exposure conditions, the optical sensor module 10 captures the plurality of image signals and generates correspondingly the different image quality signals.

Finally, in Step S109, after a plurality of groups of image signals is generated, an image signal having the best image quality signal is selected from the image signals, and the exposure condition of the image signal is used for setting an optimal exposure condition corresponding to the working surface.

Through the above steps, the optical sensor module 10 can automatically adjust the exposure condition thereof so that the optical sensor module 10 can adapt to different working surfaces, thereby reducing the probability of errors in judging the direction and distance of movement due to uneven brightness of the light reflected by the working surfaces.

Figure 3:
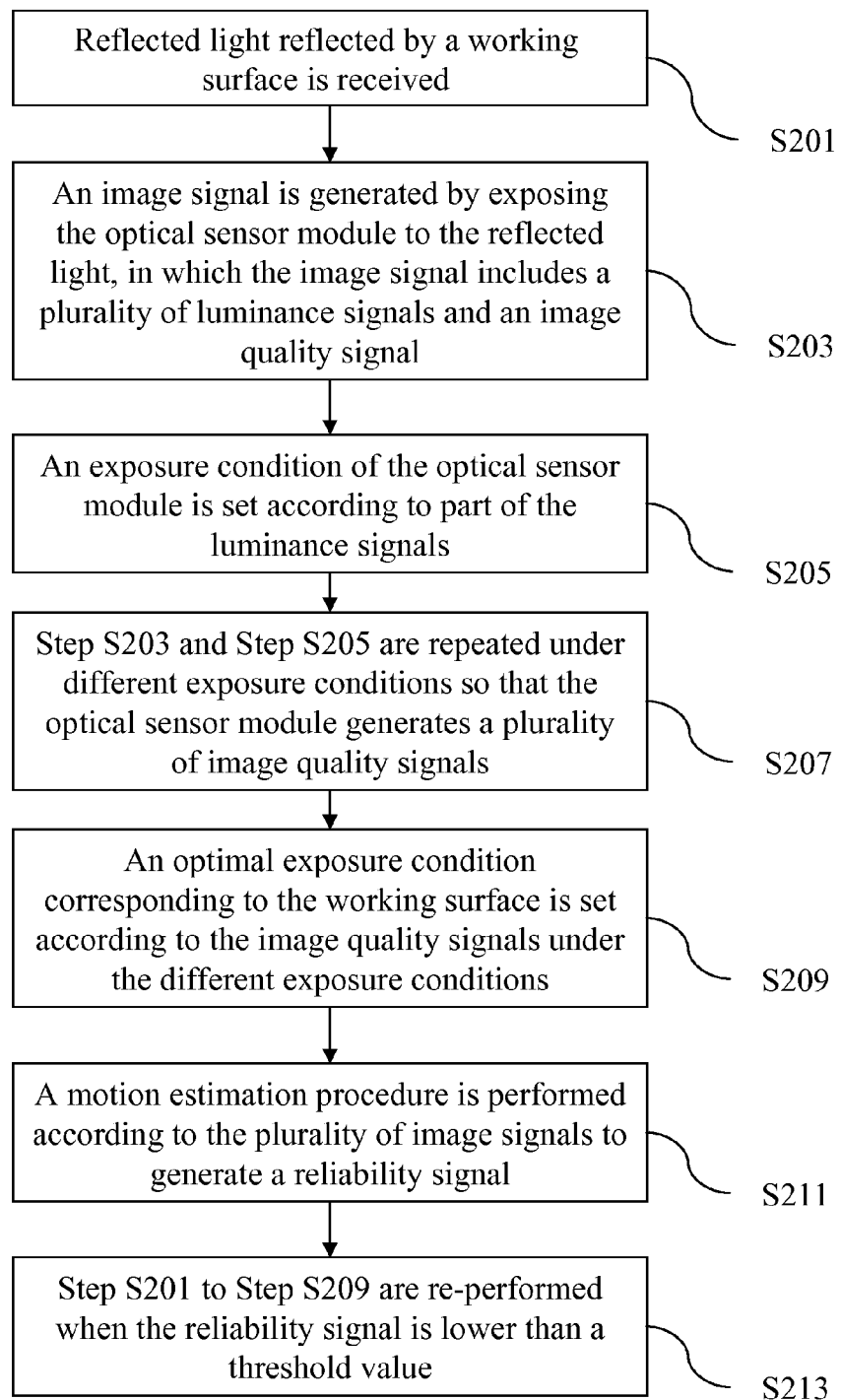
FIG. 3 is a flow chart of a second embodiment of the method for adjusting the exposure condition of an optical sensor module according to the present invention.

In order to increase the accuracy in judging the direction and distance of movement, the present invention further provides another embodiment. FIG. 3 is a flow chart of a second embodiment of the method for adjusting the exposure condition of the optical sensor module according to the present invention.

Step S201 to Step S209 are the same as Step S101 to Step S109, and thus details are not repeated herein.

In Step S211, the processor 18 carries out a motion estimation procedure according to the plurality of image signals to generate a reliability signal. The motion estimation procedure processes the adjacent image signals in a sequence of time. The processor 18 may find an image feature from the first image signals in the sequence of time, and search for identification results approximate to the image feature in the last image signals. The difference between the identification results and the image feature can be converted into a cost function. The processor 18 selects the most approximate identification result and the second most approximate identification result according to the cost function, and calculates a difference between the cost function of the most approximate identification result and the cost function of the second most approximate identification result as a reliability signal. The greater the difference of the cost functions is, the higher the reliability is, and vice versa.

In Step S203, according to a preset threshold value, the processor 18 judges the reliability signal relative to the threshold value. If the reliability signal is smaller than the threshold value, it represents that the current exposure condition cannot adapt to the current working surface. Thus, the processor 18 re-performs Steps S201 to S209 to generate another exposure condition so as to adapt to the current working surface.

Through the above method, the accuracy of judging the direction and distance of movement can be increased.

What is claimed is:

1. A method for adjusting an exposure condition of an optical sensor module, the optical sensor module applicable to a pointing device, comprising:
(A) receiving reflected light reflected by a working surface;
(B) generating an image signal by exposing the optical sensor module to the reflected light, wherein the image signal comprises a plurality of luminance signals and an image quality signal, wherein Step (B) comprises:
dividing the image signals into a plurality of blocks corresponding to the plurality of luminance signals; and
arranging the luminance signals in a sequence according to a luminance value;
(C) setting an exposure condition of the optical sensor module according to part of the luminance signals, wherein Step (C) comprises:
selecting part of the luminance signals according to a sequence of the luminance signals;
averaging out the luminance signals; and
setting the exposure condition of the optical sensor module according to an average of the luminance signals;
(D) repeating Step (B) and Step (C) under different exposure conditions so that the optical sensor module generates a plurality of image quality signals, wherein Step (D) comprises:
setting the different exposure conditions by selecting different parts of the luminance signals each time according to the sequence of the luminance signals; and
generating correspondingly the different image quality signals under the different exposure conditions; and
(E) setting an optimal exposure condition corresponding to the working surface according to the image quality signals under different exposure conditions.

2. The method according to claim 1, wherein Step (C) further comprises:
setting a target luminance value;
generating a difference signal by comparing the target luminance value with the average of the luminance signals; and
setting the exposure condition of the optical sensor module according to the difference signal.

3. The method according to claim 1, wherein the exposure condition is one of exposure time and exposure intensity of the optical sensor module.

4. The method according to claim 1, wherein the exposure condition is light intensity of the reflected light.

5. The method according to claim 1, wherein the image quality signal represents an average contrast of the image signals.

6. The method according to claim 1, further comprising:
(F) performing a motion estimation procedure according to the plurality of image signals to generate a reliability signal; and
(G) re-performing Step (A) to Step (E) when the reliability signal is lower than a threshold value.

7. An optical sensor module, applicable to a pointing device, wherein the pointing device moves relatively to a working surface and uses the optical sensor module to detect the relative movement to generate a displacement signal, and the optical sensor module comprises:
a plurality of optical sensor units, used for periodically receiving reflected light reflected by the working surface and generating in a sequence a plurality of image signals, wherein each of the image signals comprises a plurality of luminance signals and an image quality signal; and
a processor, used for setting in a sequence an exposure condition of the optical sensor module according to part of the luminance signals of each of the image signals and setting an optimal exposure condition corresponding to the working surface according to image quality signals under different exposure conditions;

wherein the optical sensor units are divided into a plurality of blocks corresponding to the plurality of luminance signals; and the processor is used for arranging the luminance signals in a sequence according to a luminance value, selecting and averaging out part of the luminance signals according to a sequence of the luminance signals, and further setting the exposure condition of the optical sensor module according to an average of the luminance signals;

wherein the processor selects different parts of the luminance signals each time according to the sequence of the luminance signals to set different exposure conditions, and correspondingly generates the different image quality signals under the different exposure conditions.

8. The optical sensor module according to claim 7, wherein the processor compares a target luminance value with the average of the luminance signals to generate a difference signal, and sets the exposure condition of the optical sensor module according to the difference signal.

9. The optical sensor module according to claim 7, wherein the exposure condition is either one of exposure time and exposure intensity of the optical sensor module.

10. The optical sensor module according to claim 7, wherein the exposure condition is light intensity of the reflected light.

11. The optical sensor module according to claim 7, wherein the image quality signal represents an average contrast of the image signals.

12. The optical sensor module according to claim 7, wherein the processor is further used for performing a motion estimation procedure according to the plurality of image signals to generate a reliability signal and resetting another optimal exposure condition of the optical sensor module when the reliability signal is lower than a threshold value.

* * * * *